(12) United States Patent
Osterhoudt

(10) Patent No.: US 9,266,040 B2
(45) Date of Patent: Feb. 23, 2016

(54) FILTRATION SYSTEM

(71) Applicant: MPC Inc., Wilmington, DE (US)

(72) Inventor: Lewis E. Osterhoudt, Phoenixville, PA (US)

(73) Assignee: MPC, Inc., Wilmington, DE (US)

(*) Notice: Subject to any disclaimer, the term of this patent is extended or adjusted under 35 U.S.C. 154(b) by 329 days.

(21) Appl. No.: 14/031,710

(22) Filed: Sep. 19, 2013

(65) Prior Publication Data
US 2014/0021138 A1 Jan. 23, 2014

Related U.S. Application Data

(63) Continuation of application No. 12/823,571, filed on Jun. 25, 2010, now abandoned.

(60) Provisional application No. 61/220,375, filed on Jun. 25, 2009.

(51) Int. Cl.
| | |
|---|---|
| B01D 61/00 | (2006.01) |
| B01D 15/00 | (2006.01) |
| B01D 17/00 | (2006.01) |
| C02F 1/00 | (2006.01) |

(Continued)

(52) U.S. Cl.
CPC ............... *B01D 15/20* (2013.01); *B01D 29/21* (2013.01); *B01D 35/06* (2013.01); *B01D 39/2017* (2013.01); *B01D 39/2082* (2013.01); *B01D 61/027* (2013.01); *B01D 61/04* (2013.01); *B01D 2201/291* (2013.01); *B01D 2201/302* (2013.01); *B01D 2201/34* (2013.01); *B01D 2201/4046* (2013.01); *B01D 2239/025* (2013.01); *B01D 2239/0414* (2013.01); *B01D 2239/065* (2013.01); *B01D 2239/069* (2013.01); *B01D 2311/04* (2013.01)

(58) Field of Classification Search
CPC .... B01D 2311/04; B01D 29/21; B01D 29/58; B01D 2201/291; B01D 2239/025; B01D 39/2082; B01D 2311/106; B01D 61/14; G03C 8/06; G03F 7/07; G03F 7/3092; G03F 7/32; B41C 1/1008; B41C 2210/08
See application file for complete search history.

(56) References Cited

U.S. PATENT DOCUMENTS

| | | |
|---|---|---|
| 3,368,687 A | 2/1968 | Ruschman |
| 3,827,566 A | 8/1974 | Ponce |

(Continued)

FOREIGN PATENT DOCUMENTS

| | | | |
|---|---|---|---|
| EP | 1312473 | * | 5/2003 |

OTHER PUBLICATIONS

FloClear, D-02 Installation and Operation Manual rev. 4, Mar. 3, 2006, 14 pages.

*Primary Examiner* — Ana Fortuna
(74) *Attorney, Agent, or Firm* — Baker & Hostetler LLP

(57) ABSTRACT

A filtration system and methods for using same are disclosed. The filtration system can include a frame, and a plurality of filters coupled to the frame and coupled to each other in series. A pump can provide a pressure differential that causes fluid to flow through the filters in series. The first filter can be provided as a pre-filter, and one or more additional filters can include pleated, calendared, micro-fiber filters. Another filter can be a percentage removal nano-filter that is adapted to remove sub-micron particles from the fluid. The nano-filter can include three pleated filter layers. Each pleated filter layer can be oriented approximately concentrically about a common longitudinal axis.

27 Claims, 8 Drawing Sheets

(51) Int. Cl.
*C02F 9/00* (2006.01)
*B01D 27/06* (2006.01)
*B01D 63/00* (2006.01)
*B01D 24/00* (2006.01)
*B01D 15/20* (2006.01)
*B01D 29/21* (2006.01)
*B01D 35/06* (2006.01)
*B01D 39/20* (2006.01)
*B01D 61/04* (2006.01)
*B01D 61/02* (2006.01)

(56) References Cited

U.S. PATENT DOCUMENTS

| | | |
|---|---|---|
| 4,857,195 A | 8/1989 | Brownell et al. |
| 5,198,107 A | 3/1993 | Ponce |
| 5,376,278 A | 12/1994 | Salem |
| 5,520,816 A | 5/1996 | Kuepper |
| 5,552,048 A | 9/1996 | Miller et al. |
| 5,824,232 A | 10/1998 | Asher et al. |
| 5,980,759 A | 11/1999 | Proulx et al. |
| 6,293,198 B1 * | 9/2001 | Mizuno ............ B41F 7/24 101/424 |
| 6,838,005 B2 | 1/2005 | Tepper et al. |
| 6,908,558 B2 | 6/2005 | Stinson |
| 6,970,589 B2 | 11/2005 | Crell |
| 7,087,159 B2 | 8/2006 | Stinson |
| 7,112,282 B2 | 9/2006 | Stinson |
| 7,314,547 B2 | 1/2008 | Stinson et al. |
| 7,315,547 B2 | 1/2008 | Yazaki |
| 7,320,751 B2 | 1/2008 | Donatelli |
| 7,601,262 B1 | 10/2009 | Tepper et al. |
| 7,922,006 B2 | 4/2011 | Fall et al. |
| 2006/0219613 A1 | 10/2006 | Scheu et al. |
| 2008/0087612 A1 * | 4/2008 | Holtwick ............ B01D 61/14 210/780 |
| 2009/0200227 A1 | 8/2009 | Sakamoto et al. |
| 2010/0102002 A1 | 4/2010 | O'Brien et al. |
| 2010/0326928 A1 | 12/2010 | Osterhoudt |
| 2011/0278243 A1 | 11/2011 | Levy |

* cited by examiner

FILTRATION SYSTEM

CROSS-REFERENCE TO RELATED APPLICATIONS

This application is a continuation of U.S. patent application Ser. No. 12/823,571, filed Jun. 25, 2010, which claims priority to U.S. Provisional Patent Application Ser. No. 61/220,375, filed Jun. 25, 2009, the disclosure of which is hereby incorporated by reference as if set forth in its entirety herein.

TECHNICAL FIELD

The present invention generally relates to filtration systems, and in particular relates to a filter usable in a multi-unit filtration system for removing contaminants from a fluid.

BACKGROUND

Filters are widely used to remove contaminates from a fluid stream, gas, or liquid. For example, fluid that has been contaminated during an industrial application can be passed through one or more filters of a filtration system that operates separately from the industrial process. The filtration system removes contaminating particles from the contaminated fluid and outputs filtered fluid to the industrial application that has a lower level of contaminants than the contaminated fluid.

Unfortunately, conventional filtration systems are expensive and do not reliably remove contaminating particles, particularly particles of small sizes. As a result, the particles can amass within the industrial application, causing contamination, and/or clogging and ultimately inefficient downtime resulting from shutting down the application to perform maintenance.

It is desirable to provide a filtration system that can reliably and cost-effectively remove contaminants from a fluid associated with an industrial process.

SUMMARY

Fluid filtration systems and methods are disclosed. A fluid filtration system can include a frame, four filters coupled to the frame and coupled to each other in series, and a pump coupled to a first pre-filter. The four filters can include the first pre-filter. The four filters can include second and third pleated, calendared, micro-fiber filters. The four filters can include a fourth percentage removal nano-filter that is adapted to remove sub-micron particles from the fluid. The nano-filter can include three pleated filter layers. Each pleated filter layer can be oriented approximately concentrically about a single longitudinal axis. The pump can be to create pressure in the fluid flowing through the four filters.

Each pleated filter layer can include electro-positive nanoalumina fibers grafted onto microglass structural fibers. The filtration system can further include a filter head having a mounting hub and castellations located around the periphery of the mounting hub, a filter head coupling each of the four filters to respective conduits. The fluid can be usable in any desired industrial system, such as a printing press or lithography fountain solution, a dairy or other agricultural farm, an electroplating process, or any other system in which removal of sub-micron sized contaminating particles is desired.

A method for filtering a fluid can include the steps of pumping a fluid from a processing environment into a first pre-filter, removing solid particles greater than a minimum particle size of approximately 5-7 microns from the fluid in the first pre-filter, pumping the fluid from the first pre-filter to a second pleated, calendared, micro-fiber filter, removing solid particles greater than a minimum particle size of approximately 0.45-1 micron from the fluid in the second filter, pumping the fluid from the second filter to a third pleated, calendared, micro-fiber filter, removing solid particles greater than a minimum particle size of approximately 0.2 microns from the fluid in the third filter, pumping the fluid from the third filter to a fourth percentage removal nano-filter, pumping the fluid through first, second, and third pleated filter layers located in the nano-filter, each filter layer being oriented approximately concentrically about a single longitudinal axis, removing sub-micron size particles from the fluid in the nano-filter, and pumping the fluid from the nano-filter to the processing environment. All of the filter elements filter contaminants, such as contaminating particles, either through adsorption, absorption, and "catching."

The step of pumping the fluid through first, second, and third pleated filter layers can include each pleated filter layer including electro-positive nanoalumina fibers grafted onto microglass structural fibers. The fluid can be a printing press or lithography fountain solution.

BRIEF DESCRIPTION OF THE DRAWINGS

The foregoing summary, as well as the following detailed description of a preferred embodiment, are better understood when read in conjunction with the appended diagrammatic drawings. The drawings show an embodiment that is presently preferred. Thus, the invention is not limited to the specific instrumentalities disclosed in the drawings. In the drawings.

DETAILED DESCRIPTION OF ILLUSTRATIVE EMBODIMENTS

Figure 1:
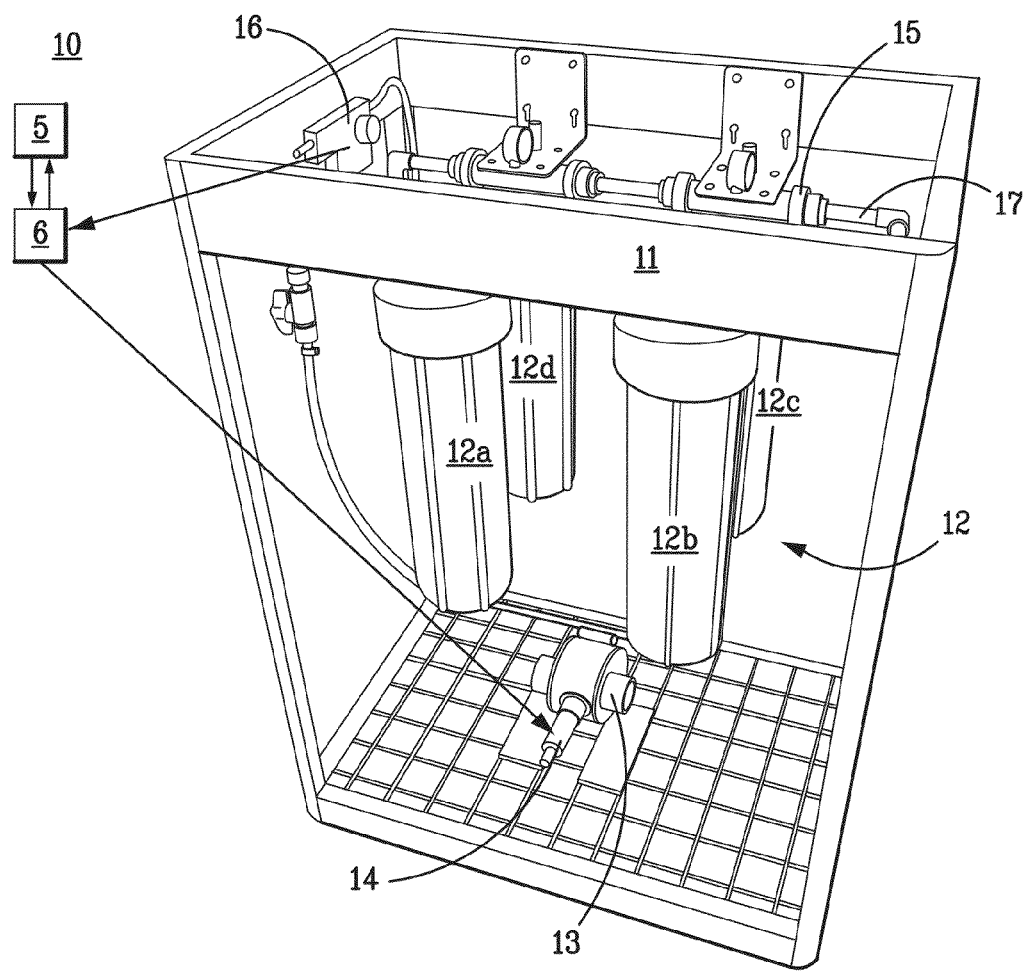
FIG. 1 is a perspective view of a filtration system including a plurality of filters constructed and arranged in accordance with one embodiment.

Referring to FIG. 1, a filtration system 10 includes a plurality of filter assemblies including a first filter 12a, a second filter 12b, a third filter 12c, a fourth filter 12d, and a pump 13 connected in series via corresponding conduits 17 and supported on a frame 11 or like support structure. Each filter 12a-d is connected to a filter head or adapter 15 that connects the filter to the corresponding upstream and downstream conduits 17. It should be appreciated that the terms "upstream" and "downstream" herein are used with respect to the flow of fluid through the filtration system 10.

The filtration system 10 receives contaminated fluid at an inlet end 14 from an industrial system 5. The industrial system 5 can provide an industrial process, such as a chemical process, oil and gas process, water treatment process, printing process, electroplating processes, and/or any desirable process that utilizes a fluid in such a manner that the fluid can accumulate contaminating particles during operation. The industrial process can receive fluid from a basin or reservoir 6, which can also supply the contaminated fluid to the inlet end 14. In the illustrated embodiment, the pump 13 induces a pressure in the conduits 17 that causes fluid to flow sequentially through the filters 12a-d. The filters 12a-d remove particles from the fluid to produce a clean output fluid having a reduced quantity of particles with respect to the contaminated input fluid.

The output fluid flows from the filtration system 10 into the reservoir 6, which can be bifurcated into a first and second chamber that retains the contaminated and clean fluid, respectively. In this regard, the industrial process of the industrial system 5 can input its fluid from the clean chamber, and output its used, contaminated fluid into the dirty chamber, while the filtration system 10 inputs contaminated fluid from the dirty chamber and outputs clean fluid into the clean chamber. It is appreciated that the flow of fluid through the industrial system 5 and the filtration system 10 via the reservoir 6 is provided by way of example only, and numerous alternative configurations are envisioned. Accordingly, unless otherwise specified, the present invention is not intended to be limited to the described embodiment.

While the filters, collectively identified at 12, comprise four filters that are coupled together in series, it should be appreciated that the filtration system 10 can alternatively include any desired number of filters, including, for example, 1, 2, 3, 5, 6, 8, 10, 12, or more, depending on the desired level of filtration, including the minimum size of particles to be removed, type of particles to be removed, and fluid flow rate through the filtration system 10.

In the illustrated embodiment, the filters 12 are configured to allow a progressively smaller maximum particle size to pass through, as the fluid progresses sequentially from the first filter 12a through to the fourth filter 12d. All of the filters 12 function to filter contaminants, such as contaminating particles, either through adsorption, absorption, and "catching." For example, the first filter 12a can be configured to remove particles having a largest dimension greater than or equal to approximately 7 microns, the second filter 12b can be configured to remove particles having a largest dimension greater than or equal to approximately 0.45 microns, the third filter 12c can be configured to remove particles having a largest dimension greater than or equal to approximately 0.2 microns to pass through, and the fourth filter 12d can remove particles having a largest dimension less than 0.2 microns. Although filters 12 of specific particle size ratings are discussed herein, filters 12 of any size rating can be used in the filtration system 10, depending on the particular desired performance characteristics of the filtration system 10.

Figures 2, 3D:
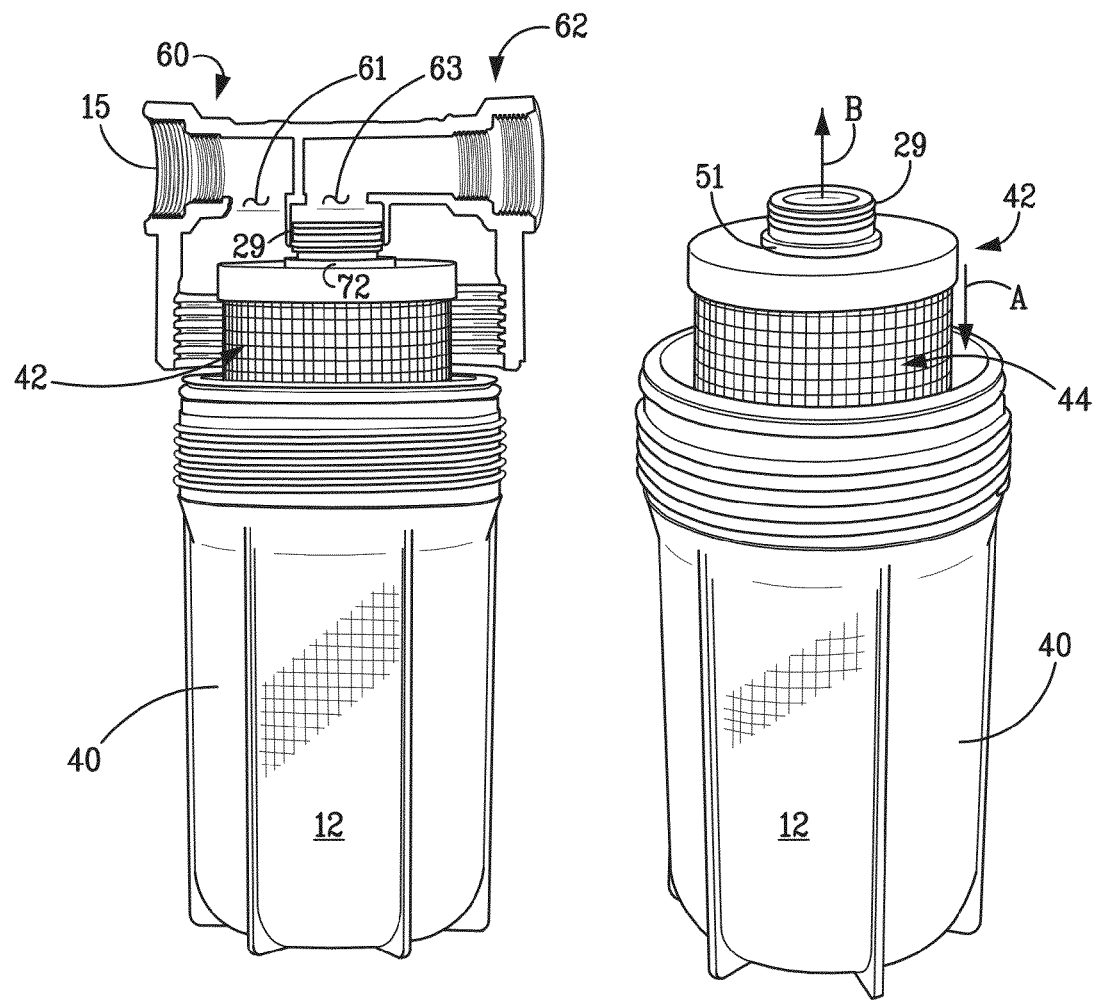
FIG. 2 is a perspective view of a filter illustrated in FIG. 1 connected to a filter head.
FIG. 3D is a perspective view of the filter cartridge illustrated in FIG. 3B fully inserted into the housing illustrated in FIG. 3B.

Referring now to FIG. 2, each filter 12 can be coupled to its associated conduits 17 by its associated filter head 15. Each filter head 15 includes an inlet end 60 and an outlet end 62 that is disposed downstream of the inlet end 60. The inlet end 60 delivers contaminated fluid to its associated filter, and the outlet end 62 receives filtered, or "clean" fluid from the associated filter, and provides a pathway for the delivery of the fluid from the associated filter to a downstream location.

Figure 3A:
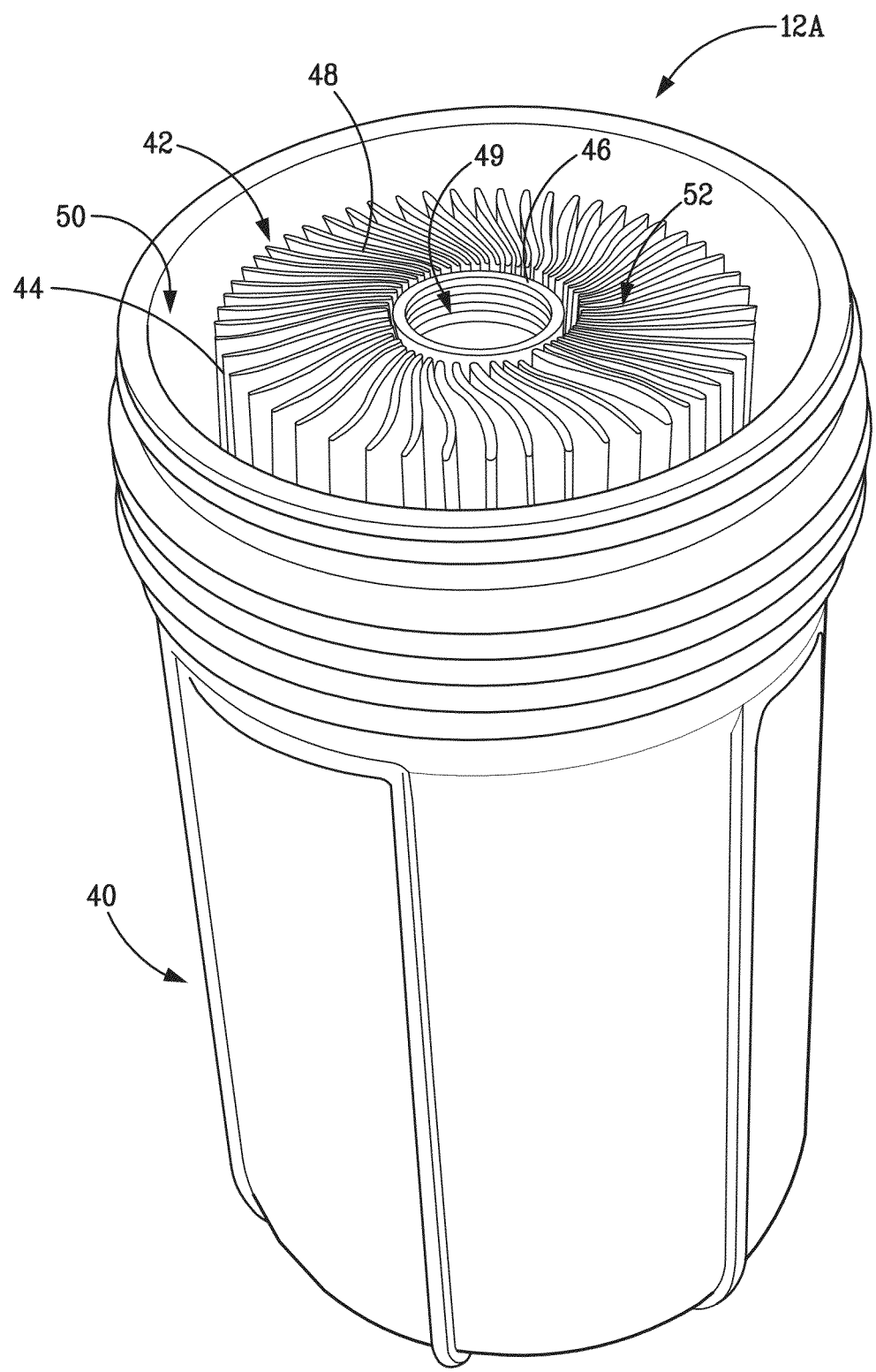
FIG. 3A is a partial perspective view of a filter including a filter housing and a filter cartridge.
Figure 3B:
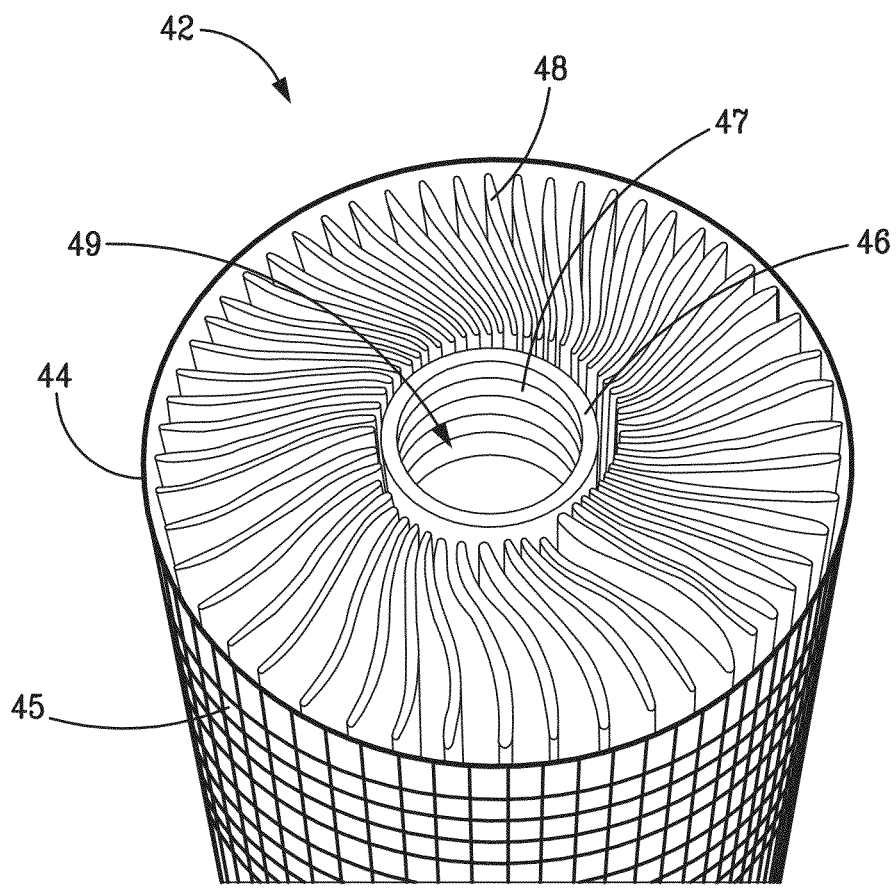
FIG. 3B is a partial perspective view of the filter cartridge illustrated in FIG. 3A.

Referring to FIGS. 3A-B, the general construction of the filters 12a-d can be described with reference to the first filter 12a, unless otherwise indicated. It should be appreciated that while one construction is illustrated in detail, numerous filter constructions are envisioned and intended to fall within the scope of the present invention unless otherwise indicated. In the illustrated embodiment, the filter 12A can include an outer housing 40 and a cartridge 42 that is received by the outer housing 40. The cartridge 42 includes a porous outer annular shroud 44 and a porous inner annular post 46 that defines an internal cylindrical void 49. The filter 12A defines a housing void 50 that is disposed between the outer housing 40 and the cartridge 42, and is in fluid communication with the filter head 15. The filter 12A defines a cartridge receptacle 52 that is disposed between the annular shroud 44 and the inner post 46. The cartridge receptacle 52 can also be configured as an annulus depending on the geometric configuration of the shroud 44 and post 46. The filter media 48 can be disposed in the cartridge receptacle. The post 46 can be coupled to the filter head 15 in the manner described below.

Both the shroud 44 and the post 46 can be formed from injection molded plastic that is perforated to allow the fluid to flow through. For instance, the shroud 44 is illustrated as defining a plurality of openings 45 that are arranged in a plurality of circumferentially spaced axial columns that extend therethrough and place the housing void 50 in fluid communication with the cartridge receptacle 52. The post 46 likewise includes a plurality of openings 47 that are arranged in circumferentially spaced axial columns that extend therethrough and place the cartridge receptacle 52 in fluid communication with the cylindrical void 49 of the post 46. The openings 47 can be circumferentially elongate as illustrated, or can assume any suitable alternative geometric configuration.

Figure 3C:
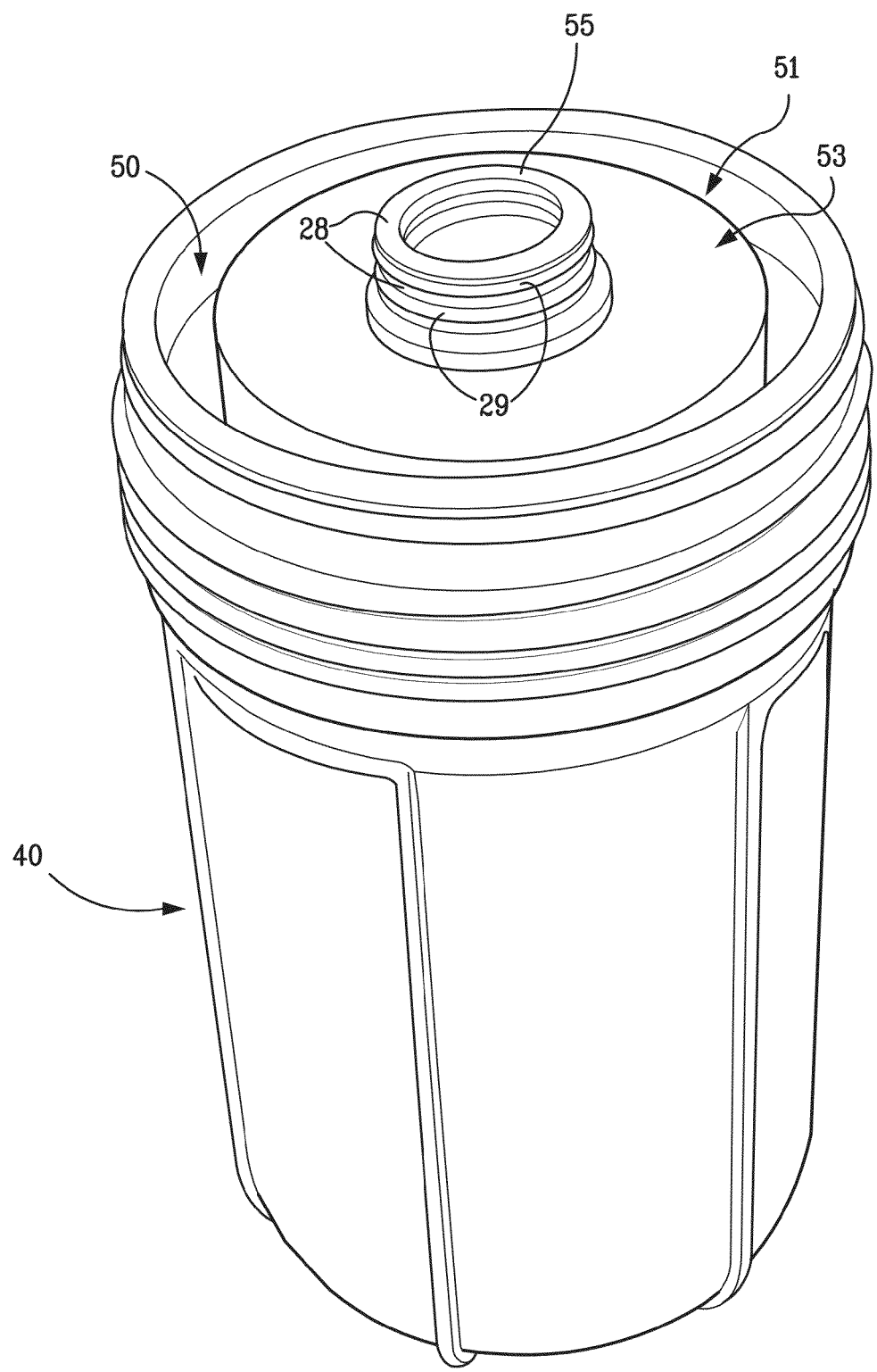
FIG. 3C is a perspective view of the filter cartridge illustrated in FIG. 3A as fully assembled being inserted into the housing illustrated in FIG. 3A.

As shown in FIG. 3C, the filter cartridge 42 includes an upper end cap 51 that closes the upper end of the shroud 44. The end cap 51 includes a generally annular end cap body 53 that is sealed against the upper end of the shroud 44 either through a melting operation, an adhesive operation, or the like. Alternatively still, the end cap 51 can be integral with the shroud 44. The end cap 51 defines an inner cylindrical central hub 55 that is aligned with the void 49 of the post 46. The hub 55 can be sealed against, or constructed integrally with, the post 46, and can thus be considered an upper, or outer, end of the post 46.

The hub 55 can include a pair of grooves 28, each groove 28 being adapted to accommodate insertion of a respective O-ring 29, which can be elastomeric or define any alternative material property as desired. The O-rings 29 enhance the seal at the interface between the upper end of the hub 55 (or upper end of the post 46) and the inner surface of the associated filter head 15. The double O-ring construction can help ensure that the seal between each filter 12 and the filter head 15 is at least as effective in preventing particles of a desired size from passing into the fluid as the filter media 48 inside the particular filter 12 is at removing particles of that desired size from the fluid. While a pair of grooves 28 is illustrated, it should be appreciated that the hub 55 can include any number of grooves as desired that support the insertion of an O-ring 29.

As illustrated in FIG. 3D, the filter cartridge 42 can be installed into the housing 40 in an axially downward direction A until the bottom end of the cartridge 42 seats against the bottom of the housing 40. The cartridge 42 can include a bottom end cap (joined to the shroud 44 in the manner described above with respect to the upper end cap 51) that abuts the bottom of the housing 40, or the filter media 48 and/or shroud 44 can abut the bottom of the housing. Accordingly, fluid passing into the void 49 of the post 46 forced to pass through the filter media 48 as will now be described.

In particular, referring again to FIG. 2, the filter head 15 defines a first conduit 61 that is in fluid communication with the input end 60 to deliver contaminated fluid to the filter 12a. The filter head 15 further defines a second conduit 63 in fluid communication with the hub 55 (see FIG. 3C) to receive filtered fluid from the filter 12a. The first and second conduits 61 and 63 of the filter head 15 are separated from each other to avoid cross-contamination of input and output fluid.

Referring to FIGS. 2, 3A, and 3C, during operation, the contaminated fluid flows from the first conduit 61 of the filter head 15 down into the housing void 50. The end cap 51 can be nonporous to prevent the contaminated fluid from flowing through the end cap into the filter media 48. The outer housing 40 is also nonporous. Accordingly, as fluid pressure amasses in the void 50, the fluid flows radially inward through the shroud 44 and filter media 48, and through the post 46. The fluid travels up through the internal void 49 of the post 46 to the filter head 15, and subsequently travels downstream in the filtration system along the associated conduit 17. In this regard, it should be appreciated that each filter receives "contaminated" fluid and outputs filtered or "clean" fluid that has a level of contaminating particles that is less than the level of contaminating particles present in the "contaminated" fluid. Likewise, the filtration system receives "contaminated" fluid from the industrial process, and outputs "clean" fluid to the industrial process that has a level of particles that is less than the level of particles present in the "contaminated" fluid. When the cartridge 42 is to be removed, the filter housing 40 can be removed from the filter 12a in the manner described below, and the cartridge 42 can be pulled out of the housing 40 along the direction of Arrow B of FIG. 3D.

Figure 4A:
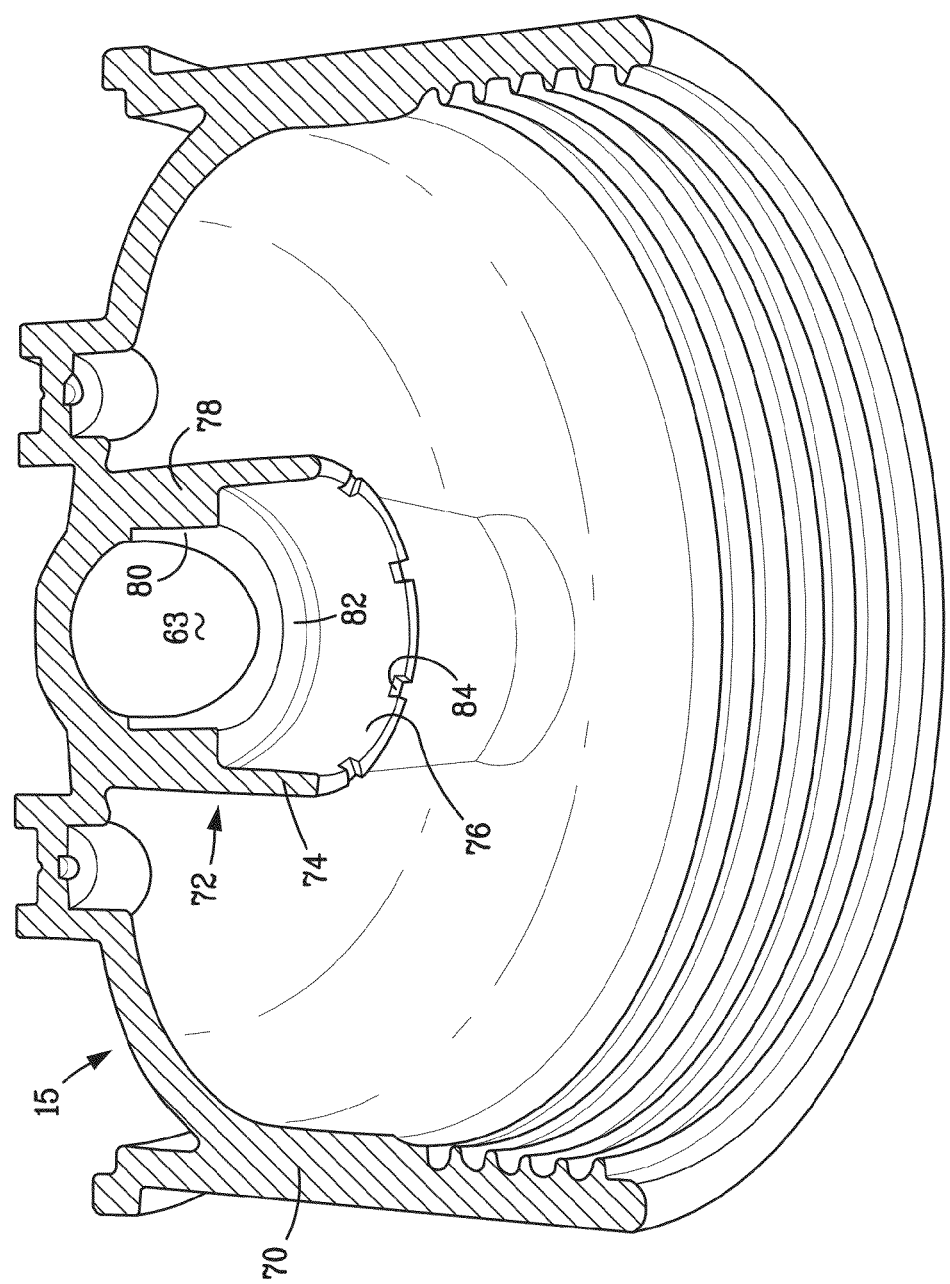
FIG. 4A is a sectional perspective view of the filter head illustrated in FIG. 2.
Figure 4B:
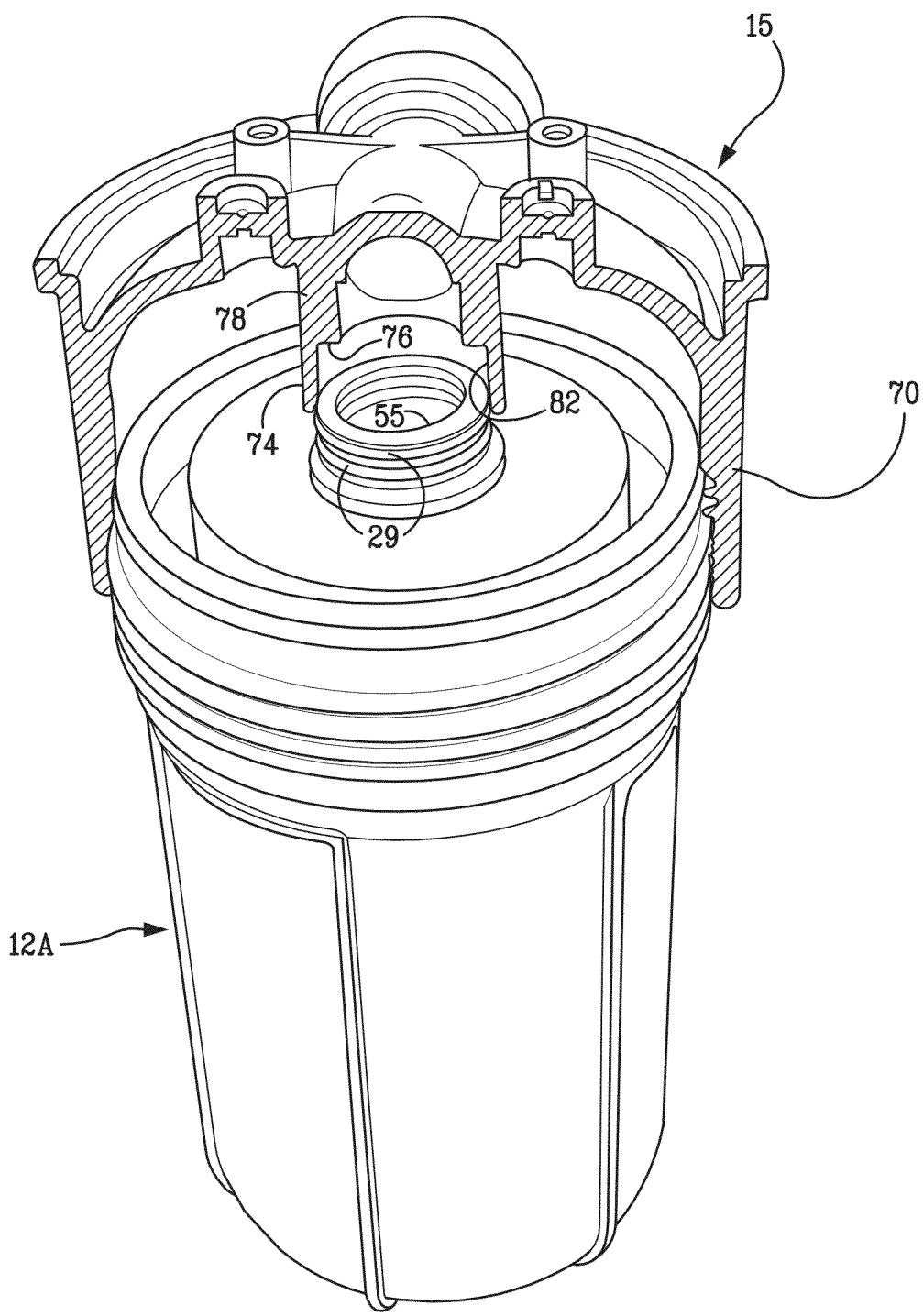
FIG. 4B is a sectional perspective view of a filter connected to the filter head illustrated in FIG. 4A.

The construction of the filter head 15 and attachment and detachment of the filter housing 40 to and from the filter 12a will now be described with reference to FIGS. 4A-B. In particular, the filter head 15 includes an outer circumferential body 70 having a threaded inner surface that can mate with a corresponding threaded outer surface of the housing 40, and an inner mounting neck 72 that defines the second conduit 63. The mounting neck 72 includes a lower portion 74 that defines an inner surface 76, and an upper portion 78 that defines an inner surface 80. The mounting neck 72 can be stepped such that the inner surface 76 of the lower portion 74 defines a diameter that is greater than that of the inner surface 80 of the upper portion 78. A downward-facing circumferential seat 82 is thus defined at the interface between the upper portion 78 and the lower portion 74.

In accordance with the illustrated embodiment, the lower portion 74 of the mounting neck 72 can include castellation notches 84 disposed at the bottom surface of the lower portion 74. The castellation notches 84 prevent an end user from installing a filter cartridge with a flat smooth gasket instead of a filter cartridge with a double o-ring seal as depicted in FIG. 3C. For instance, without the castellation notches 84, the lower portion 74 could have a smooth bottom surface which would allow an end user to install a filter cartridge with a flat smooth gasket that abuts the bottom surface of the lower portion 74. This would compromise the integrity of the filtration system 10 as a whole because a flat smooth gasket may not reliably prevent a desired percentage of particles of the size trapped by the filter media from infiltrating the system 10. In contrast, the double o-ring construction shown in FIG. 3C is effective at preventing the influx of the size particle trapped by the filter media. The castellation notches 84 therefore prevent the end user from having the mistaken belief that the smooth lower portion can form a reliable seal with the flat gasket to keep small particles out of the system, as the castellation notches would define visible gaps between the bottom surface of the lower portion 74 and the flat gasket. The castellation notches 84 can thus provide an indicator that the filter head 15 may not provide an adequate seal to such small particles when used in a flat gasket arrangement of the type described immediately above. The castellation notches 84 are described in more detail with reference to an adapter as shown an described in U.S. Pat. No. 7,320,751, the disclosure which is hereby incorporated by reference as if set forth in its entirety herein.

The O-rings 29 associated with the present filter cartridge 42 are configured to seal against the inner surface 76 of the lower portion 74 (as opposed to abutting the bottom end of the lower portion 74) thereby providing a reliable seal with respect to small particles. Because the seal formed between the filter cartridge and the inner surface of the neck 72 effectively seals sub-micron particles from flowing into the outlet stream without first passing through filter media 48, the filters (and in particular the fourth filter 12d as described below) are configured to remove sub-micron particles from the fluid. In the embodiment illustrated in FIG. 4B, the upper end of the upper end of the hub 55 of the filter cartridge 42 can abut the seat 82 of the filter head 15 in its installed position such that both O-rings 29 are disposed above the castellation notches 84, thus sealing both O-rings 29 against the inner surface 76. The O-rings 29 can be coated with a lubricant if desired, to assist in sliding the filter cartridge 42 in its installed position. Of course, any number of O-rings 29 can be used to seal against the inner surface 76 as desired. Furthermore, the upper end of the hub 55 of the filter cartridge 42 need not abut the seat 82 of the filter head 15 so long as the filter cartridge 42 provides a reliable seal with respect to the neck 72 of the filter head 15.

The first filter can be utilized to provide, for example, a pre-filter that is rated to remove particles that are at least 7 microns in size. As used herein, a filter that has a particular rating number, for example 7 microns, means that the filter is capable of removing particles that are at least the size of the rating number. The filter media 48 can be configured such that the first filter 12a is a 7-micron "catch" filter that can remove large particles (at least 7 microns in size) and absorb oil that may be present in the contaminated fluid. Additionally or alternatively, the first filter 12a can be specifically designed for oil removal, for instance, by incorporating filter media with fine denier polypropylene fibers. The first filter 12a can be a relatively course woven bag filter whose filter media 48 is polypropylene that can remove relatively large visible "globs" of material, as well as other particles having a size, for example, of at least 7 microns. The filter media 48 can be provided as a three-ply structure, or any suitable structure that removes particles from fluid that passes therethrough.

In an alternative embodiment, the first filter 12a can be a 5-micron polyester pleated cartridge. For example, when the fluid that enters the filtration system 10 from the processing environment does not have significant oil particles, and where the particulate load in the fluid is relatively high, using a first filter 12a that is rated at 5 microns can provide more effective protection (e.g., extension of usable life) of the second filter 12b than a 7-micron first filter 12a. Alternatively still, the first filter 12a can be configured to remove any size particles as desired by incorporating filter media with different combinations of fiber diameters and by varying the degree of calendaring applied to the filter web.

The first filter 12a can protect or extend the usable life of the second filter 12b by preventing particles having a size of at least 7 microns from entering the second filter 12b and clogging, overwhelming, and/or reducing the useful life of the second filter 12b. In this regard, each filter 12 in the filtration system 10 can protect or extend the usable life of the downstream filters by preventing particles of a specified size from flowing downstream and entering any of the downstream filters or industrial system 5. The particle size rating of the first filter 12a, and of the downstream filters in the filtration system 10, can be chosen, for example, to remove a small enough minimum size particle (e.g., having a largest dimension of at least a specified size, for instance 7 microns), while preventing an excessive drop of liquid pressure as the liquid passes through the filtration system 10. In addition to absorbing and catching particles, the first filter 12a generally adsorbs oils and oil based liquids while allowing water to pass through. It will be appreciated that the second and third filters 12b, 12c, in addition to absorbing and catching particles, may also adsorb oils in certain alternative embodiments.

The second filter 12b can be constructed as described above with respect to the first filter 12a, but whose filter media can be made from polypropylene configured to remove particles having a largest dimension of at least 0.45-micron. The second filter 12b can thus remove particles that pass through the first filter 12a, and thus is rated to filter particles having a size that is less than the size of particles that are filtered by the first filter 12a.

The second filter 12b can alternatively be provided as a 1.0-micron nominally rated, pleated, calendared, micro-fiber polypropylene filter. For example, when the fluid that enters the filtration system 10 from the industrial system 5 has a smaller particle size distribution, using a second filter 12b that is rated at 1.0 microns can provide a similar level of protection of the third filter 12c as a 0.45-micron second filter 12b, but at a lower cost.

The third filter 12c can be constructed in the manner described above with respect to the first and second filters, but whose filter media can be made from polypropylene configured to remove particles having a largest dimension of at least 0.2 micron. Hence, during operation the third filter 12c removes particles that pass through the second filter 12b, for example, particles having a largest dimension between 0.2 and 0.45 micron. Of course, it should be appreciated that the third filter 12c can be constructed to alternatively remove particles having any desired largest dimension.

The fourth filter 12d can be provided as a multi-layered percentage removal nano-filter, or nano-filter, that is capable of removing a percentage of sub-micron size particles including colloids and microbiological particles through adsorption, absorption, and catching. For example, the filter media of the fourth filter 12d can be made from nanoalumina fibers grafted onto microglass structural fibers.

Figure 5:
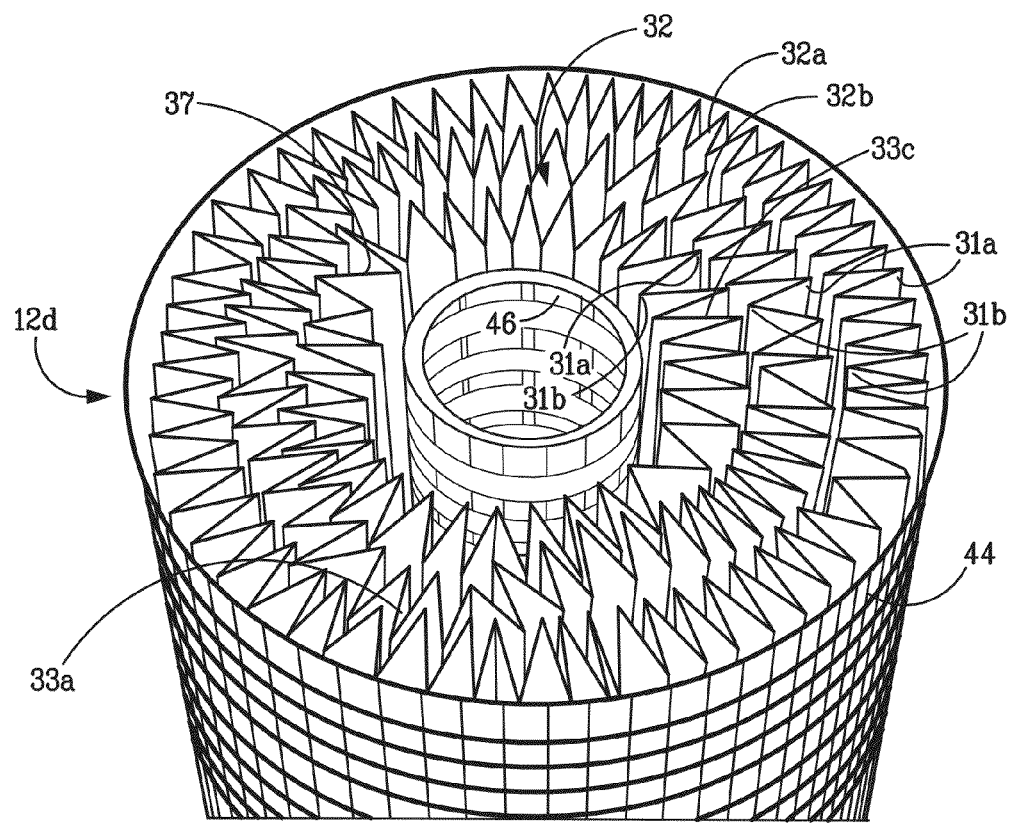
FIG. 5 is a perspective view of a multi-layer nanofilter suitable for use in the filtration system illustrated in FIG. 1.

Referring now to FIG. 5, the fourth filter 12d can be a multi-layered nano-filter. The nano-filter 12d can include an outer support cage or shroud 44, an inner support core or post 46, and one or more pleated nano-filter layers 32 comprised of filter media 48 located in the cartridge receptacle 52 that is disposed between the shroud 44 and the post 46. In use, fluid entering the nano-filter 12d can flow into the nano-filter 12d through the plurality of openings 45 of the outer shroud 44. The fluid can then pass through the pleated filter layers 32 and out of the nano-filter 12d through the openings 47 of inner post 46. The filter media 48 of the pleated filter layers 32 can be made from Disruptor™ media, for example, that is manufactured by Ahlstrom, Inc. having corporate offices located in Helsinki, Finland. The filter media 48 is further described in U.S. Pat. No. 7,601,262, the disclosure of which is hereby incorporated by reference as if set forth in its entirety herein.

The pleated filter layers 32 can include, for example, a first pleated filter layer 32a, a second pleated filter layer 32b, and a third pleated filter layer 32c, each successive pleated filter layer 32 being located generally radially inside the previous pleated filter layer 32, wherein all pleated filter layers 32 are oriented substantially concentrically about a common longitudinal axis 37, which defines a central axis of the post 46. Thus, each successive inner pleated filter layer can define an outer circumference that is generally being less than the outer pleated filter layer, and a number of pleats that is generally less than the outer pleated filter layer.

While generally, layer 32c fits within the inner diameter of layer 32b and layer 32c fits within the inner diameter of 32b, it will be appreciated that these layers may overlap in areas 33. Each layer 32a, 32b, and 32c comprises a series of outer points 31a and inner points 31b. These outer points 31a generally define the outer circumference of a layer 32. Inner points 31b generally define the inner circumference of a layer 32. The outer points 31a may be disposed radially outward or inward of the inner points 31b of the next outer layer. Furthermore, a portion of the outer points 31a of a given layer may be disposed radially outward of the inner points 31b of the next outer layer, and a portion of the outer points 31a of the given layer may be disposed radially inward of the inner points 31b of the next outer layer. For example, as identified at region 33a, certain outer points 31a of the middle layer 32b are disposed radially outward of inner points 31b of the outermost layer 32a. Similarly, as identified at region 33b, certain outer points 31a of the innermost layer 32c are disposed radially outward of the inner points 31b of middle layer 32b. In this regard, regions of the layers 32a, 32b, and 32c may overlap with respect to a circumferentially extending axis. Alternatively, certain outer points 31a of the middle layer 32b are disposed radially inward of inner points 31b of the outermost layer 32a. Similarly, certain outer points 31a of the innermost layer 32c are disposed radially inward of the inner points 31b of middle layer 32b. In this regard, regions of the layers 32a, 32b, and 32c may not overlap each other with respect to a circumferentially extending axis. Embodiments may include any number of overlapping regions 33 or spaced regions. A portion, up to all, of a given layer may overlap a radially adjacent layer, while a portion, up to all, of a given layer may be radially spaced from a radially adjacent layer.

Referring now to FIG. 5, the three layers of filter media 32a, 32b, and 32c each have different numbers of pleats. The outer layer 32a has the largest number of pleats and inner layer 32c has the smallest number of pleats. The number of pleats in each layer can be determined at least in part based on the desired number of pleats for the given surface area of filter media in each layer 32a, 32b, and 32c. For instance, an outer layer having a larger circumferential length has more pleats than an inner layer having a smaller circumferential length. Because the pleats of adjacent layers are not pleated together to produce layers that are fully nested within each other, a gap is disposed between adjacent layers of filter media. Accordingly, during operation, fluid passes from one layer, through the gap, and subsequently through the adjacent layer, finding its own path through one of the pores 35 (see FIG. 6) and subsequently enhancing the overall performance of the filter. It will be appreciated that the pleats of two or more layers may intersect or otherwise be joined at certain locations without affecting the overall performance of the filter, so long as at least a portion up to all of each layer is spaced from its adjacent layer so as to define a gap between the layers.

Alternatively, in some embodiments, each of the pleated filter layers 32 can be co-pleated in a single pleated orientation. Although three pleated filter layers 32 are shown in FIG.

5, any number of pleated filter layers 32 can be used, including 1, 2, 4, 5, 6, 8, 10, or any other number of pleated filter layers 32 that may be needed to meet the particular desired performance characteristics of the filtration system 10.

Yet another embodiment may comprise filter media 48 that forms a single filter layer 32 that is wrapped spirally around post 46 (not shown). In this embodiment, filter layer 32 would function similarly to the embodiment depicted in FIG. 5.

The inclusion of three pleated filter layers 32 in the nano-filter 12d can be more effective at removing sub-micron size particles than a single pleated filter layer. For example, each pleated filter layer 32 can be made from a percentage removal media (e.g., Disruptor™ media), which means that a particular percentage of sub-micron size particles (e.g., 99.9%) is removed from a liquid as the liquid passes through each pleated filter layer 32. Therefore, wherein fluid passing through a single pleated filter layer 32 can include one-thousandth of the sub-micron particles that were previously in the fluid, fluid passing through three pleated filter layers 32 in series can include one-billionth of the sub-micron particles that were previously in the fluid.

Figure 6:
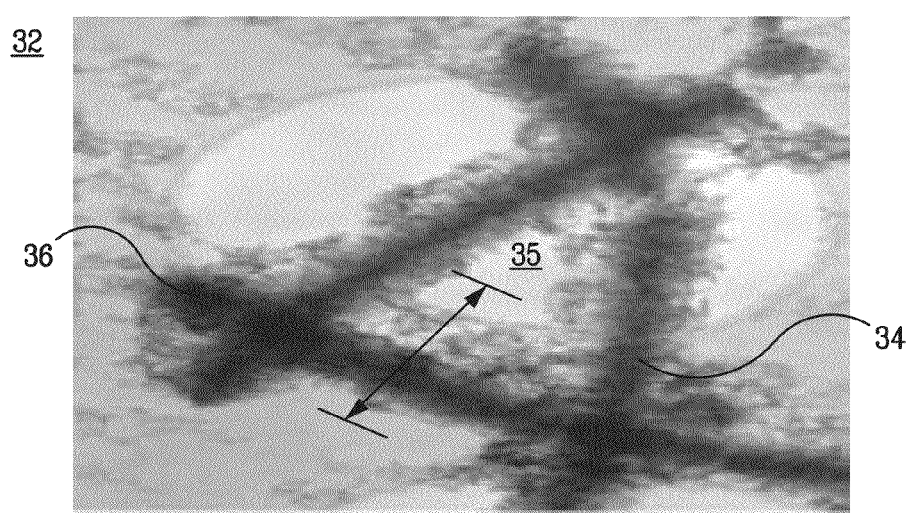
FIG. 6 is an enlarged view of a nanofilter layer of the nanofilter illustrated in FIG. 5, showing a pore defined between charged fibers of the nanofilter layer.

Referring now to FIG. 6, each of the pleated filter layers 32 can include a web of nanoalumina fibers that have an electrokinetic charge potential resulting from exposed Al+++ ions on the surface of the fibers. Because the nanoalumina fibers in pleated filter layers 32 are electro-positive, the pleated filter layers 32 can remove negatively charged microorganisms such as bacteria and viruses, as well as endotoxins. For example, fumed silica particles of approximately 25 nanometers in size can be adsorbed and separated from a fluid by electro-adhesion to the nanoalumina fibers in the pleated filter layers 32.

For example, FIG. 6 depicts three microglass fibers 34 included in a pleated filter layers 32, each microglass fiber 34 being coated with nanoalumina. The microglass fibers 34 can be dimensioned as desired, for instance 0.65 microns in width, and can define respective pores 35 that can be dimensioned as desired, such as 3 microns long by 2 microns wide as illustrated. Due to the high electrokinetic charge potential of the nanoalumina coated microglass fibers 34, each microglass fiber 34 produces a charge field 36 that extends up to 1 micron away from the center of the microglass fiber 34 in each direction (e.g., in water and other polar solutions), measured in a direction perpendicular to the longitudinal axis of each microglass fiber 34. The charge field 36 surrounding each microglass fiber 34 can create a nearly total capture of the cross section of the entire volume of the pore 35. This capture is accomplished by the electrokinetic charge potential of the nanoalumina coated microglass fibers 34. In an exemplary embodiment, there can be approximately 400 layers of nanoalumina coated microglass fibers 34 in each approximately 0.8 mm thick pleated filter layer 32. In an exemplary embodiment, the flow rate of the fluid through the pleated filter layers 32 can be set at a predetermined maximum flow rate so that particles are not forced through the charge field 36 of the microglass fibers 34 without being retained in the pleated filter layers 32.

While the filtration system 10 has been illustrated and described in connection with four filters 12a-d having particular construction and filtration characteristics (such as particle size ratings), it should be appreciated that the filtration system 10 can include one or more of the above-described filters in any desired order, and can include greater than or less than four filters as desired. For instance, the filtration system can include a single filter provided as the fourth filter 12d described herein, or a pair of filters including any of the filters 12a-c in combination with the fourth filter 12d, or three filters including one or more of the filters 12a-c in combination with the fourth filter 12d.

In one embodiment, the industrial process 5 can be a printing or lithographic environment. A printing or lithographic environment typically includes a fountain solution, which is an aqueous component in a printing or lithographic process that prevents ink from depositing in the non-image areas and cleans the background areas of the printing plate. Such fountain solutions can become contaminated by the inks being used. The particles can include various contaminants that need to be removed, including, for example, solvents, pigments, dyes, resins, lubricants, solubilizers, surfactants, particulate matter, fluorescers, and other materials. Removing these particles from the fountain solution can increase the useful life of the fountain solution, reduce the amount of maintenance time spent cleaning the printing or lithography equipment, and/or reduce the amount of scrap produced by the equipment. In such an environment, the fountain solution can be circulated out of a fountain solution storage tank, through the filtration system 10, and back into the storage tank for continued use in the printing or lithographic environment. The filtration system 10 can allow a user to maintain the quality of a fountain solution without disturbing the chemistry (e.g., maintaining conductivity and pH) of the solution. For example, in an exemplary embodiment, the filtration system 10 can be used to clean a fountain solution having a pH of 3.5-9.

The industrial process 5 can be a water filtration system for a dairy farm, which can filter some or all of the water entering the dairy farm. The use of the filtration system 10 can improve the health of animals and the quality and quantity of the milk produced. The industrial process 5 can be a water filtration system for a pharmaceutical environment or for a drinking water environment. In the dairy farm, pharmaceutical environment, and drinking water environment, the filtration system 10 can remove endotoxins, bacteria, viruses and/or other contaminants from the water. For example, an embodiment of the filtration system 10 was able to reduce endotoxins levels in a pharmaceutical environment to levels below 0.25 EU/ml, which is the maximum limit for pharmaceutical water for injection quality. In an exemplary embodiment, industrial process 5 can be a reverse osmosis system for a high end water treatment system.

The industrial process 5 can be an electroplating environment. For example the filtration system 10 can be used to remove trace metals in the discharge fluid from an electroplating process. The filtration system 10 can be used to recover precious metals from the discharge fluid and dispose unwanted trace metals, so that the discharge fluid can be reused in the electroplating environment.

The embodiments described in connection with the present invention have been presented by way of illustration, and the present invention is therefore not intended to be limited to the disclosed embodiments. Accordingly, those skilled in the art will realize that the invention is intended to encompass all modifications and alternative arrangements included within the spirit and scope of the invention, as set forth by the appended claims.

What is claimed:

1. A fountain solution filtration system configured to remove particles from a fountain solution fluid of a printing or lithographic system, the fluid filtration system comprising: a fountain solution inlet
   a first mechanical filter comprising a first outer housing and a filter media disposed in the first outer housing, the filter media having a first particle size rating to remove particles from the fountain solution when the fountain solution flows through the filter media, the particles removed by the filter material having a dimension greater than the first particle size;

an electropositive filter disposed downstream of the first mechanical filter and configured to receive the fountain solution fluid from the first mechanical filter, the electropositive filter including a second outer housing that is separate from the first outer housing, the electropositive filter further including a web of electro-positive fibers disposed in the second outer housing, wherein the electropositive filter defines a flow path through the web of electro-positive fibers, the electropositive fibers having an electro-positive electrokinetic charge that attracts and filters negatively charged material from the fountain solution so as to remove the negatively charged material from the fountain solution fluid when the fountain solution fluid passes along the flow path through the web of electro-positive fibers.

2. The filtration system of claim 1, further comprising a frame, wherein the first and second outer housings are supported by the frame.

3. The filtration system of claim 1 wherein the electropositive fibers comprise nanoalumina fibers grafted onto microglass structural fibers.

4. The filtration system of claim 1, wherein at least one of the filters further comprises a filter head having a mounting hub and castellations located around the periphery of the mounting hub, the filter head coupling the filter to a respective conduit that carries the fountain solution fluid from the first mechanical filter to the electropositive filter.

5. The filtration system of claim 1, wherein the electropositive filter comprises at least one filter layer that includes the web of electro-positive fibers.

6. The filtration system of claim 5, wherein the at least one filter layer comprises a first filtration layer and a second filtration layer concentrically spaced from the first filtration layer, each of the first and second filtration layers comprising a respective web of the electro-positive fibers.

7. The filtration system of claim 6, wherein the pleated filter layers each have different numbers of pleats.

8. The filtration system of claim 6, wherein the electropositive filter comprises three pleated filter layers.

9. The filtration system of claim 8, wherein at least a portion of a select one of the pleated filter layers overlaps its adjacent filter layer.

10. The filtration system of claim 9, wherein at least a portion of the select one of the pleated filter layers does not overlap its adjacent filter layer.

11. The fountain solution filtration system of claim 1, wherein the particles are sub-micron particles that include at least one of solvents, pigments, dyes, resins, lubricants, solubilizers, surfactants, particulate matter, and fluorescers.

12. A method of removing submicron particles from a fountain solution fluid, the method comprising the steps of:
passing the fountain solution fluid into a first filter outer housing and through a first filter material disposed in the outer housing, the first filter material having a first pore size rating, wherein the first filter removes particles that are larger than the first pore size, and passing the fountain solution out of the first filter outer housing; and after the step of passing the fountain solution fluid out of the first filter outer housing, passing the fountain solution fluid into a second filter outer housing, the second filter outer housing being different from the first filter outer housing, and having through pores defined between electro-positive fibers of a web of electro-positive fibers disposed in the second filter outer housing, the electropositive fibers having an electro-positive electrokinetic charge, wherein the step of passing the fountain solution fluid through the pores comprises attracting negatively charged material from the fountain solution fluid that is passed through the pores to the electropositive fibers so as to filter negatively charged material from the fountain solution.

13. The method of claim 12, wherein the negatively charged material comprises submicron particles.

14. The method of claim 12, wherein the step of passing the fountain solution through the pores comprises passing the fountain solution through the pores of respective webs of electro-positive fibers that comprise first and second pleated filter layers, the second pleated filter layer surrounded by the first pleated filter layer.

15. The method of claim 14, further comprising the step of sequentially removing particles from the fountain solution fluid as the fountain solution fluid sequentially through each of the first pleated filter layer and the second pleated filter layer.

16. The method of claim 12, wherein the electro-positive fibers comprise nanoalumina fibers.

17. The method of claim 12, wherein the step of passing the fountain solution fluid through the second filter includes removing at least one of solvents, pigments, dyes, resins, lubricants, solubilizers, surfactants, particulate matter, or fluorescers from the fountain solution fluid.

18. The method of claim 12, further comprising circulating the fountain solution fluid out of a storage tank toward the first filter outer housing, and from the second filter outer housing toward the storage tank.

19. A fountain solution filtration system configured to remove particles from a fountain solution fluid of a printing or lithographic system, the fluid filtration system comprising:
a source of fountain solution;
a first mechanical filter including a first outer housing and a filter media disposed in the first outer housing, the filter media having a first particle size rating, wherein the first mechanical filter is in fluid communication with the source of fountain solution fluid such that when the fountain solution fluid travels into the first outer housing and through the filter media, the filter media removes particles from the fountain solution that have a dimension greater than the first particle size; and an electropositive filter in fluid communication with the first mechanical filter and configured to receive the fountain solution fluid from the first mechanical filter, the electropositive filter including a second outer housing that is separate from the first outer housing, the electropositive filter further including a web of electro-positive fibers disposed in the second outer housing, wherein the electropositive filter defines a flow path through the web of electro-positive fibers, the electropositive fibers having an electro-positive electrokinetic charge that attracts and filters negatively charged material from the fountain solution so as to remove the negatively charged material from the fountain solution fluid as the fountain solution fluid passes along the flow path through the web of electro-positive fibers.

20. The filtration system of claim 19, further comprising a frame, wherein the first and second outer housings are supported by the frame.

21. The filtration system of claim 19, wherein the electropositive fibers comprise nanoalumina fibers grafted onto microglass structural fibers.

22. The filtration system of claim 19, wherein at least one of the filters further comprises a filter head having a mounting hub and castellations located around the periphery of the mounting hub, the filter head coupling the filter to a respective conduit that carries the fountain solution fluid from the first mechanical filter to the electropositive filter.

23. The filtration system of claim 19, wherein the electropositive filter comprises at least one filter layer that includes the web of electro-positive fibers.

24. The filtration system of claim 19, wherein the at least one filter layer comprises a first filtration layer and a second filtration layer concentrically spaced from the first filtration layer, each of the first and second filtration layers comprising a respective web of the electro-positive fibers.

25. The filtration system of claim 24, wherein the pleated filter layers each have different numbers of pleats.

26. The filtration system of claim 24, wherein at least a portion of a select one of the pleated filter layers overlaps its adjacent filter layer.

27. The fountain solution filtration system of claim 19, wherein the sub-micron particles include at least one of solvents, pigments, dyes, resins, lubricants, solubilizers, surfactants, particulate matter, and fluorescers.

* * * * *